US008963796B2

(12) United States Patent
Siddiqui et al.

(10) Patent No.: US 8,963,796 B2
(45) Date of Patent: Feb. 24, 2015

(54) METHOD OF LAUNCHING A SELECTED APPLICATION IN A MULTI-MONITOR COMPUTER SYSTEM AND MULTI-MONITOR COMPUTER SYSTEM EMPLOYING THE SAME

(75) Inventors: Samia Siddiqui, Calgary (CA); Julie Iannelli, Calgary (CA)

(73) Assignee: SMART Technologies ULC (CA)

(*) Notice: Subject to any disclaimer, the term of this patent is extended or adjusted under 35 U.S.C. 154(b) by 1022 days.

(21) Appl. No.: 12/811,688

(22) PCT Filed: Jan. 7, 2009

(86) PCT No.: PCT/CA2009/000014
§ 371 (c)(1),
(2), (4) Date: Nov. 5, 2010

(87) PCT Pub. No.: WO2009/086630
PCT Pub. Date: Jul. 16, 2009

(65) Prior Publication Data
US 2011/0037711 A1 Feb. 17, 2011

Related U.S. Application Data

(60) Provisional application No. 61/019,429, filed on Jan. 7, 2008.

(51) Int. Cl.
*G09G 1/14* (2006.01)
*G06F 3/14* (2006.01)
*G06F 9/445* (2006.01)

(52) U.S. Cl.
CPC ............ *G06F 3/1423* (2013.01); *G06F 3/1415* (2013.01); *G06F 3/1454* (2013.01); *G06F 9/445* (2013.01); *G09G 2340/0464* (2013.01); *G09G 2370/042* (2013.01); *G09G 2370/16* (2013.01)

USPC .......................................................... 345/1.1

(58) Field of Classification Search
CPC . G06F 12/23; G06F 3/1454; G09G 2320/103; G09G 2360/04
USPC .............................. 719/315; 382/128; 345/2.1
See application file for complete search history.

(56) References Cited

U.S. PATENT DOCUMENTS 6,803,906 B1    10/2004  Morrison et al.
6,972,401 B2    12/2005  Akitt et al.
(Continued)

FOREIGN PATENT DOCUMENTS

GB    WO 01/97022       *  2/2001  ................ G06F 9/44
WO    01/97022 A2          2/2001

OTHER PUBLICATIONS

"Automatic window control of inaccessible area" IP.COM Journal, IP.COM Inc., West Henrietta, NY, US, Oct. 14, 2001, 3 pages.*

(Continued)

*Primary Examiner* — Joseph Haley
(74) *Attorney, Agent, or Firm* — Katten Muchin Rosenman LLP

(57) ABSTRACT

A method of launching a selected application in a multi-monitor computer system (20) comprising a plurality of displays (22 to 26) operatively associated with at least one computing device (28) comprises in response to an application launch event, determining if the launch event was initiated from a registered display of the multi-monitor computer system; and if so, launching the application associated with the launch event on the registered display and if not, launching the application associated with the launch event on a default display of the multi-monitor computer system.

20 Claims, 10 Drawing Sheets

(56) References Cited

U.S. PATENT DOCUMENTS

| | | |
|---|---|---|
| 7,161,557 B2 * | 1/2007 | Thornton ................. 345/2.1 |
| 7,236,162 B2 | 6/2007 | Morrison et al. |
| 2007/0064984 A1 * | 3/2007 | Vassa et al. ............. 382/128 |
| 2008/0172677 A1 * | 7/2008 | Tripathi et al. .......... 719/315 |

OTHER PUBLICATIONS

Supplemental European Search Report with a completion date of Mar. 28, 2011.

* cited by examiner

METHOD OF LAUNCHING A SELECTED APPLICATION IN A MULTI-MONITOR COMPUTER SYSTEM AND MULTI-MONITOR COMPUTER SYSTEM EMPLOYING THE SAME

This application is a national stage of PCT/CA2009/000014, filed on Jan. 7, 2009, which claims priority to U.S. Provisional Patent Application No. 61/019,429, filed on Jan. 7, 2008. Each of these documents is incorporated herein by reference in its entirety.

FIELD OF THE INVENTION

The present invention relates generally to multi-monitor computer systems and in particular, to a method of launching a selected application in a multi-monitor computer system and to a multi-monitor computer system employing the method.

BACKGROUND OF THE INVENTION

Multi-monitor computer systems comprising multiple physical display devices connected to a common computing device such as for example a personal computer or the like, in order to provide an increased display area for computer programs running on the computing device, are becoming increasingly more popular. Depending on the environment, the physical display devices may be of different types (eg. liquid crystal displays (LCDs), cathode ray tubes (CRTs), interactive whiteboards (IWBs), other display panels or devices etc.) and/or different sizes. In order to accommodate multiple physical display devices, video cards in many computing devices have multiple sockets to receive cables from more than one physical display device. Alternatively, some computing devices have multiple video cards to receive cables from more than one physical display device. In either case, video data generated by the video card(s) of the computing device in response to execution of one or more computing devices programs is output to the appropriate physical display device for display. Other multi-monitor computer systems have networked physical display devices where the physical display devices are connected via a wireless or wired network and video data is provided to the physical display devices via the network connection for display.

As is well known in Windows™-type operating system environments, when an application is to be launched as a result of being selected through a double-click mouse or similar event, the operating system creates an instance of the selected application and launches the selected application within a window presented on the physical display device. The window for the selected application is typically placed in one of two positions; either at its location of last use or at a default location. Unfortunately, placing the window in either of these positions can be problematic in multi-monitor computer systems. In situations where the window for the selected application is positioned at its location of last use, if the window for the selected application at its last use was displayed on a physical display device that is different from the physical display device being used to select the application to be launched, when the selected application is launched, the window for the selected application will appear on a different physical display device than intended. In situations where the window for the selected application is positioned at a default location, if the default location is associated with a physical display device that is different from the physical display device being used to select the application to be launched, when the application is launched, the window for the selected application again will appear on a different physical display device than intended. In each case, the user must manipulate the displayed application window so that the application window is moved to the proper physical display device. In situations where the physical display devices are interactive whiteboards located at physically spaced locations, having to move from one interactive whiteboard to another in order to manipulate the displayed application window can be very inconvenient. As will be appreciated improvements on the display of launched applications in multi-monitor computer systems are desired.

It is therefore an object of the present invention at least to provide a novel method of launching a selected application in a multi-monitor computer system and a novel multi-monitor computer system employing the method.

SUMMARY OF THE INVENTION

Accordingly, in one aspect there is provided a method of launching a selected application in a multi-monitor computer system comprising a plurality of displays operatively associated with at least one computing device, said method comprising in response to an application launch event, determining if the launch event was initiated from a registered display of said multi-monitor computer system; and if so, launching the application associated with the launch event on the registered display and if not, launching the application associated with the launch event on a default display of said multi-monitor computer system.

According to another aspect there is provided a method of launching a selected application in a multi-monitor computer system comprising a plurality of displays operatively associated with at least one computing device, said method comprising in response to an application launch event, determining the display used to initiate the launch event; and launching the application associated with the launch event on that display.

According to yet another aspect there is provided a method of launching a selected application in a multi-monitor computer system comprising a plurality of displays operatively associated with at least one computing device, said method comprising in response to an application launch event, determining the display used to initiate the launch event; displaying at least one selectable element on the determined display representing a target display for the application associated with the launch event; and launching the application associated with the launch event on the target display.

According to yet another aspect there is provided a method of launching a selected application in a multi-monitor computer system comprising a plurality of displays operatively associated with at least one computing device, said method comprising in response to an application launch event, determining touch activity on the displays as the application associated with the launch event is being launched; and launching the application associated with the launch event on one of the displays based on the determined touch activity.

According to yet another aspect there is provided a multi-monitor computer system comprising a plurality of displays operatively associated with a common computing device executing an application launching procedure, said application launching procedure controlling launching of selected applications so that when an application to be launched is selected, the application is launched on the intended display.

According to yet another aspect there is provided a computer readable medium embodying a computer program for launching a selected application in a multi-monitor computer system, said computer program comprising program code for, in response to an application launch event, determining if the launch event was initiated from a registered display of said multi-monitor computer system; and program code for, if so, launching the application associated with the launch event on the registered display launching the selected application on the registered physical display device and if not, launching the application associated with the launch event on a default display of said multi-monitor computer system.

According to yet another aspect there is provided a computer readable medium embodying a computer program for launching a selected application in a multi-monitor computer system, said computer program comprising program code for in response to an application launch event, determining the display used to initiate the launch event; and program code for launching the application associated with the launch event on that display.

According to yet another aspect there is provided a computer readable medium embodying a computer program for launching a selected application in a multi-monitor computer system, said computer program comprising program code for in response to an application launch event, determining the display used to initiate the launch event; program code for displaying at least one selectable element on the determined display representing a target display for the application associated with the launch event; and program code for launching the application associated with the launch event on the target display.

According to still yet another aspect there is provided a computer readable medium embodying a computer program for launching a selected application in a multi-monitor computer system, said computer program comprising program code for in response to an application launch event, determining touch activity on the displays as the application associated with the launch event is being launched; and program code for launching the application associated with the launch event on one of the displays based on the determined touch activity.

BRIEF DESCRIPTION OF THE DRAWINGS

Embodiments will now be described more fully with reference to the accompanying drawings in which.

DETAILED DESCRIPTION OF THE EMBODIMENTS

Figure 1:
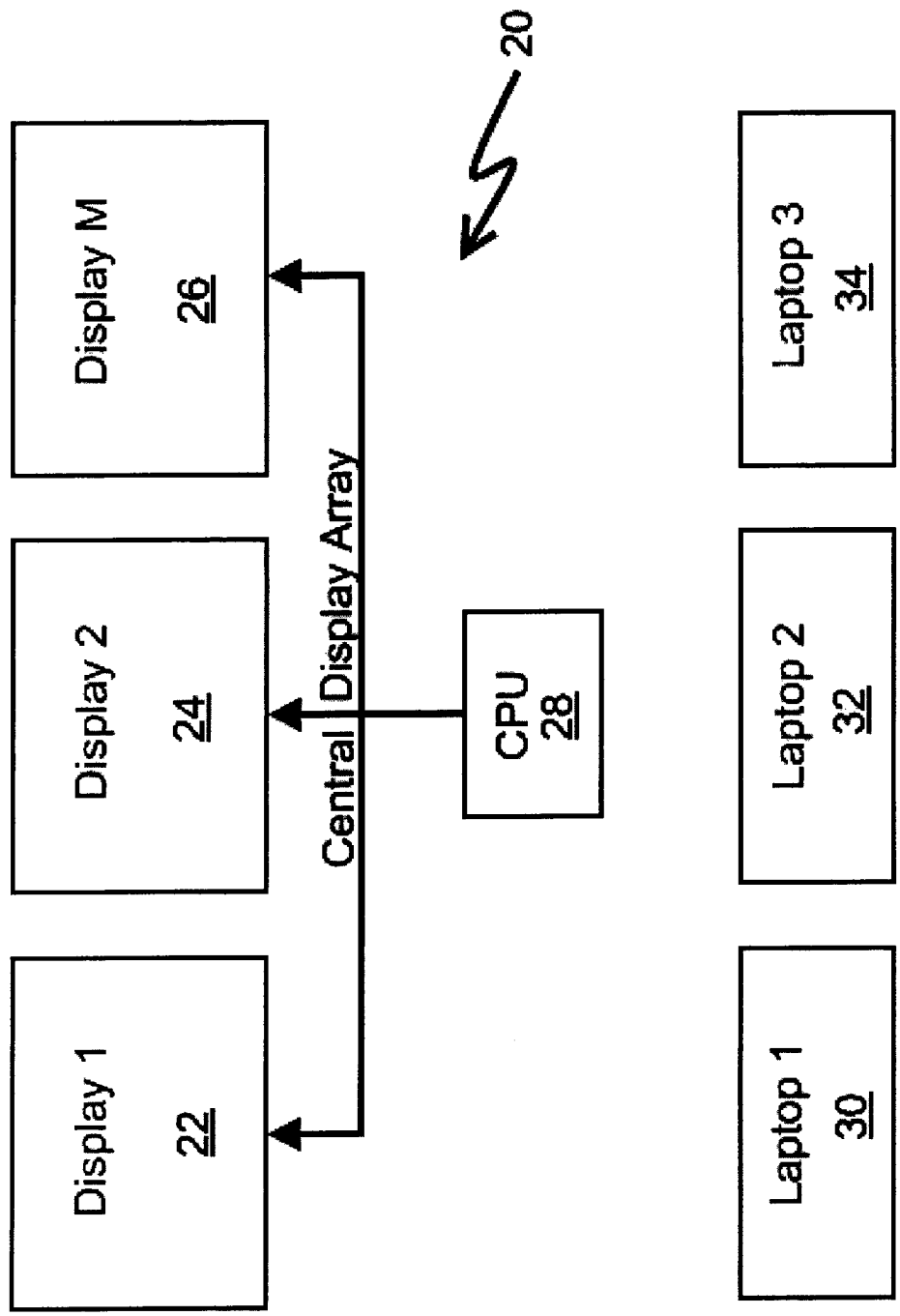
FIG. 1 is a schematic representation of a multi-monitor computer system.

Turning now to FIG. 1, a multi-monitor computer system is shown and is generally identified by reference numeral 20. As can be seen, in this embodiment the multi-monitor computer system comprises a plurality of physical display devices 22 to 26, each of which is connected to a common computing device, in this case a central computer 28. The physical display devices 22 to 26 may take a variety of forms. For example, the physical display devices may be monitors (eg. liquid crystal displays (LCDs), cathode ray tubes (CRTs), plasma display devices or other type of display panel) of the same type or of different types and/or may be of the same or different resolution. Alternatively, the physical display devices 22 to 26 may be interactive whiteboards (IWBs). Each IWB may be one of a number of types including but not limited to analog resistive, capacitive, camera-based, electromagnetic, surface acoustic wave etc. Of course, the physical display devices 22 to 26 may be a combination of monitors and IWBs. One or more other computing devices also communicate with the central computer 28. In this embodiment, three (3) laptop computers 30 to 34 are shown communicating with the central computer 28. The laptop computers 30 to 34 may communicate with the central computer 28 via windows showing software over wired communication links such as for example Ethernet or universal serial bus (USB) connections, or may communicate with the central computer 28 over wireless communication links such as for example radio frequency (RF) or BlueTooth™ connections. Although not shown, one or more remote other computing devices such as for example laptop computers, desktop computers or the like may communicate with the central computer 28 via windows sharing software over an Internet, virtual private network (VPN) or similar communication link. The windows sharing software may be one of a variety of types such as that offered by SMART Technologies ULC of Calgary, Alberta, Canada, assignee of the subject application, under the name SynchronEyes™, Bridgit™ or LinQ™ or that offered by third parties under the name WebEx™, Microsoft Remote Desktop, Netmeeting, Windows Live™ or VNC™.

Figure 2:
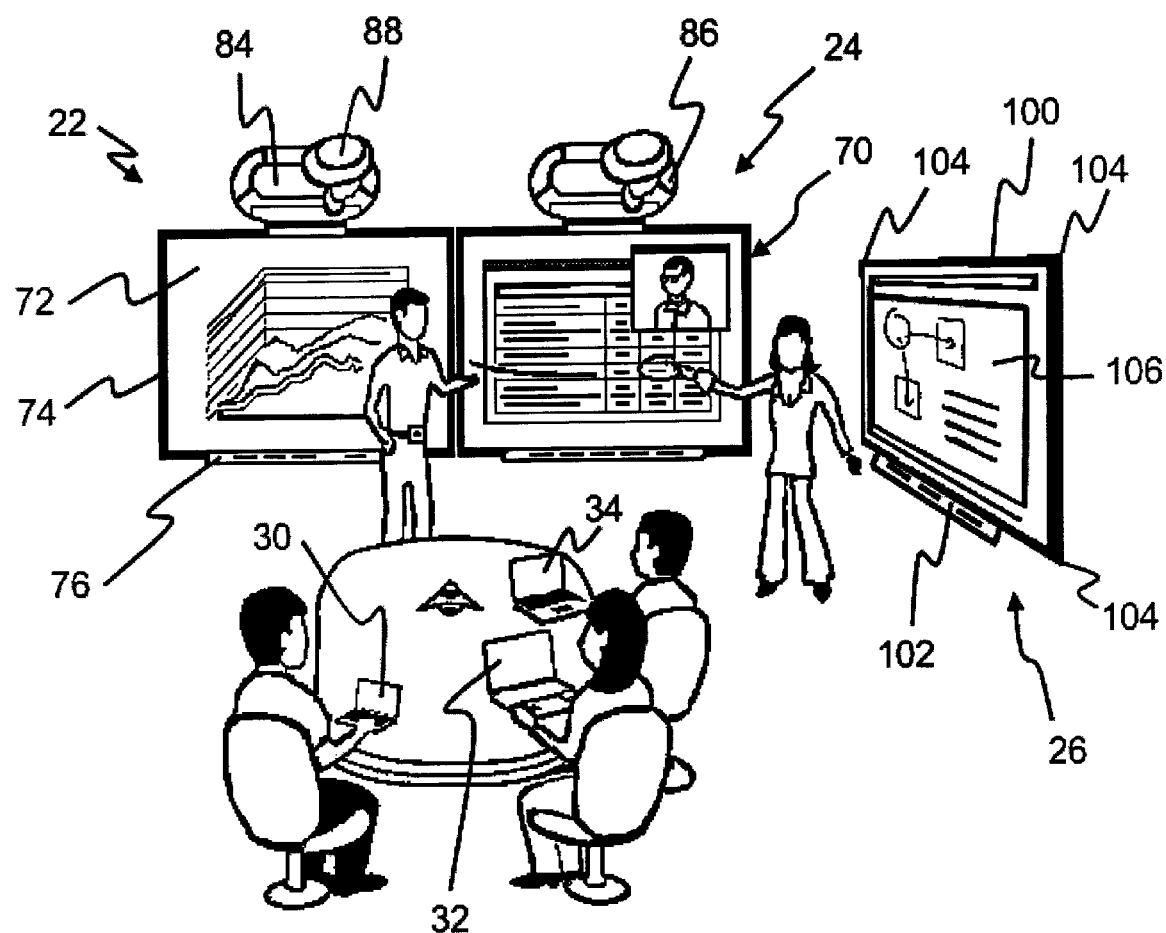
FIG. 2 shows a multi-monitor computer system deployed in a meeting room and comprising a plurality of interactive whiteboards, a personal computer and a plurality of laptop computers.
Figure 3:
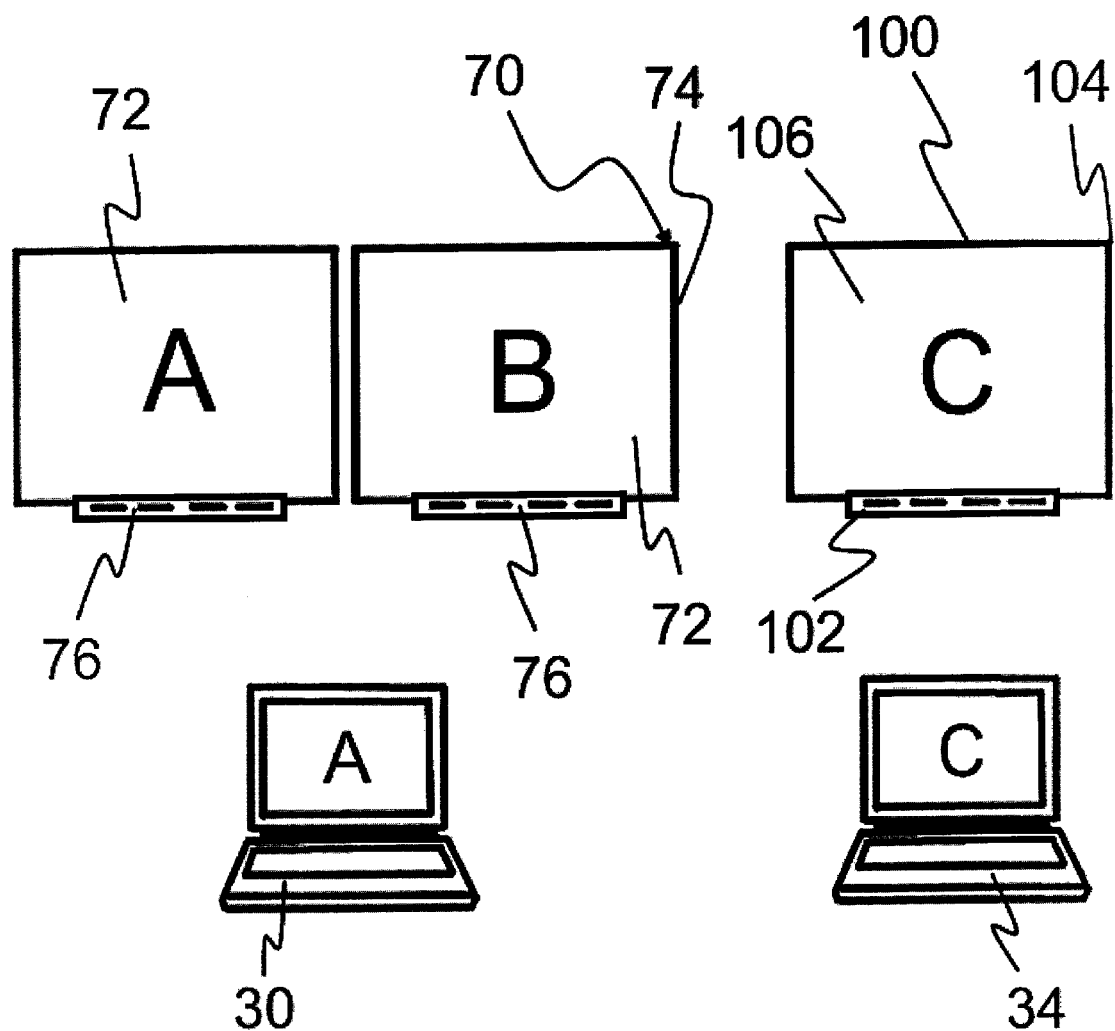
FIG. 3 shows the interactive whiteboards and two laptop computers of FIG. 2, the desktops of the laptop computers being displayed on two of the interactive whiteboards.
Figure 4A:
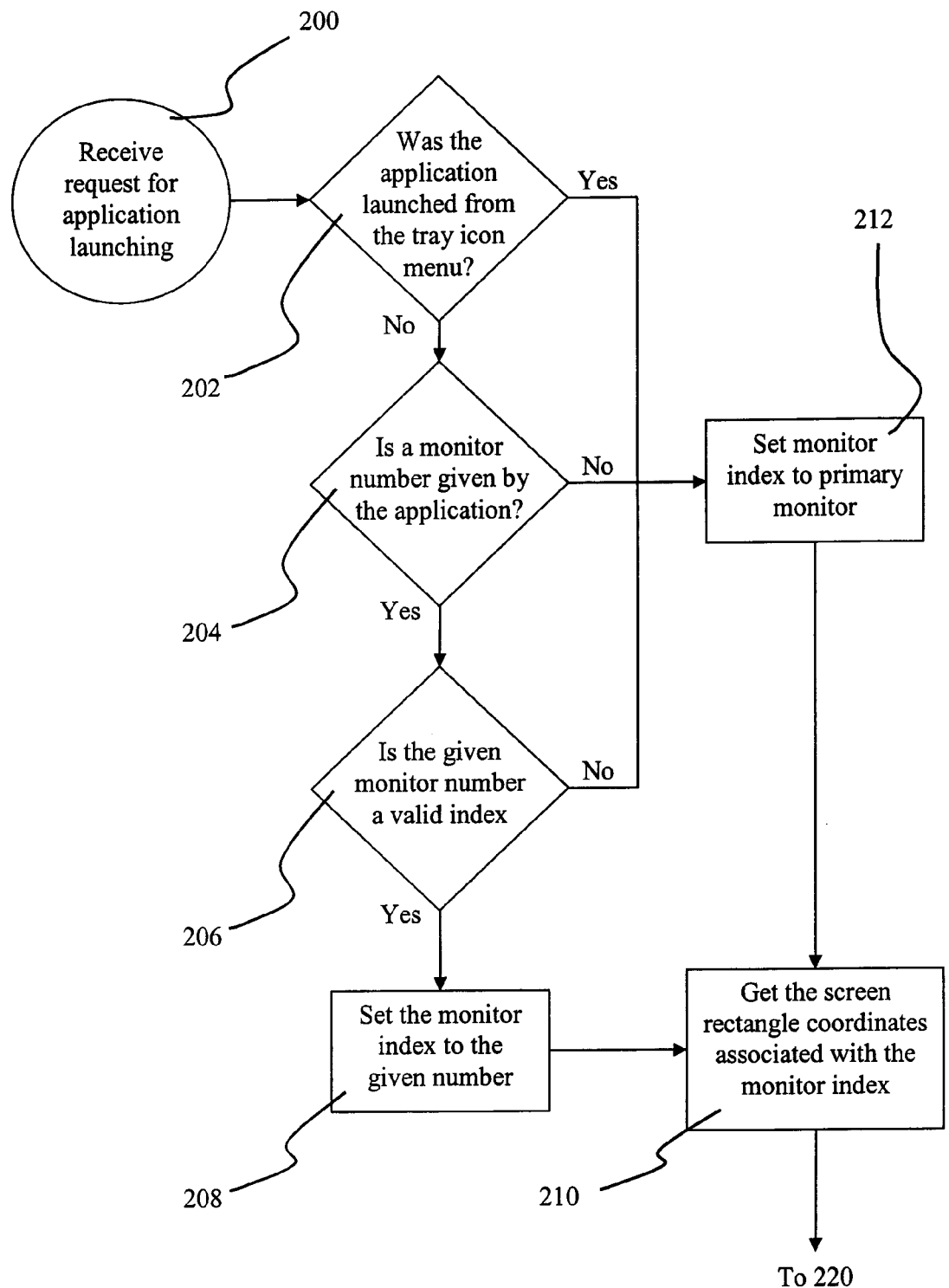
FIGS. 4A to 4F show a flowchart illustrating the steps performed during execution of an application launching procedure executed by the personal computer.
Figure 4B:
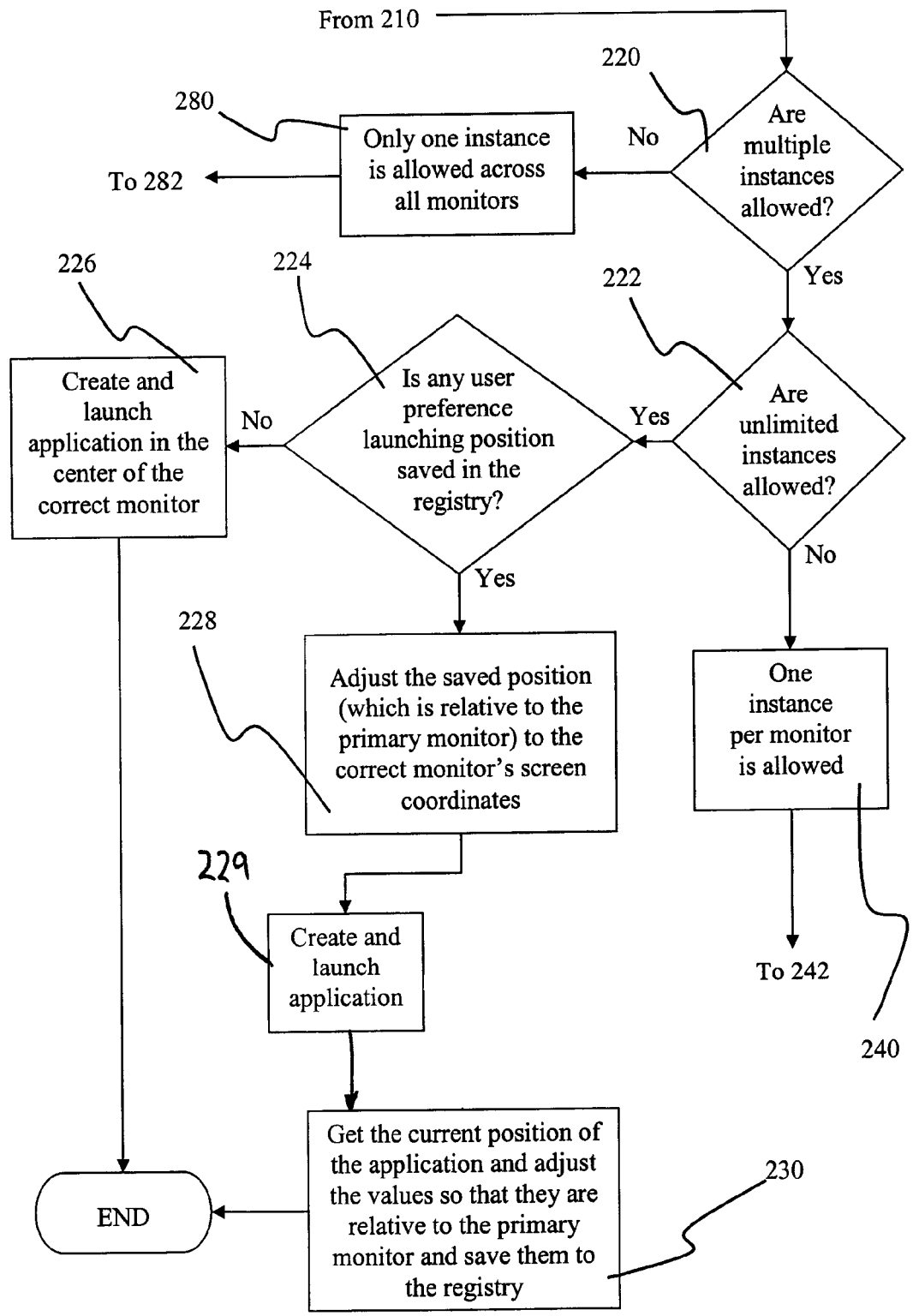
Figure 4C:
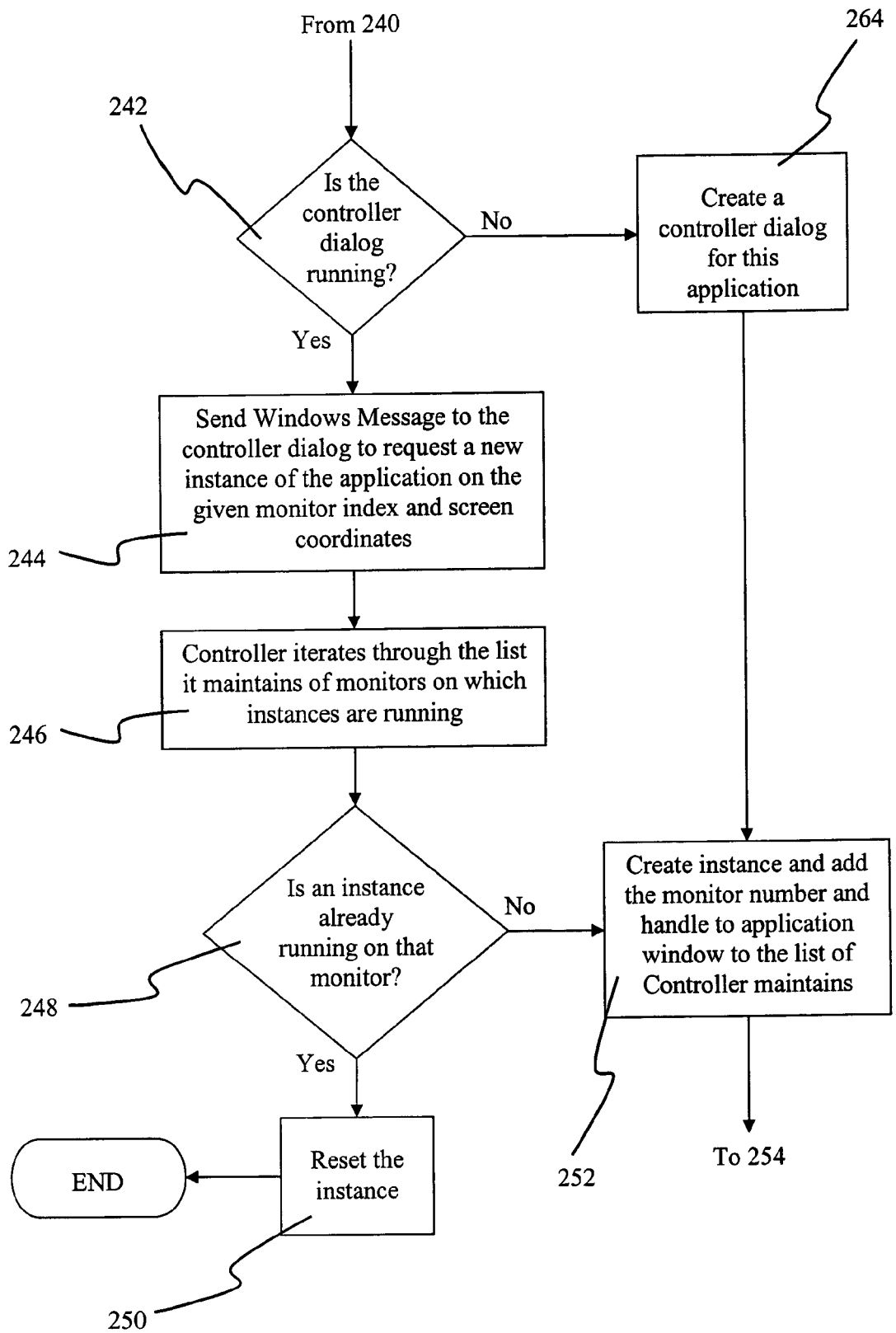
Figure 4D:
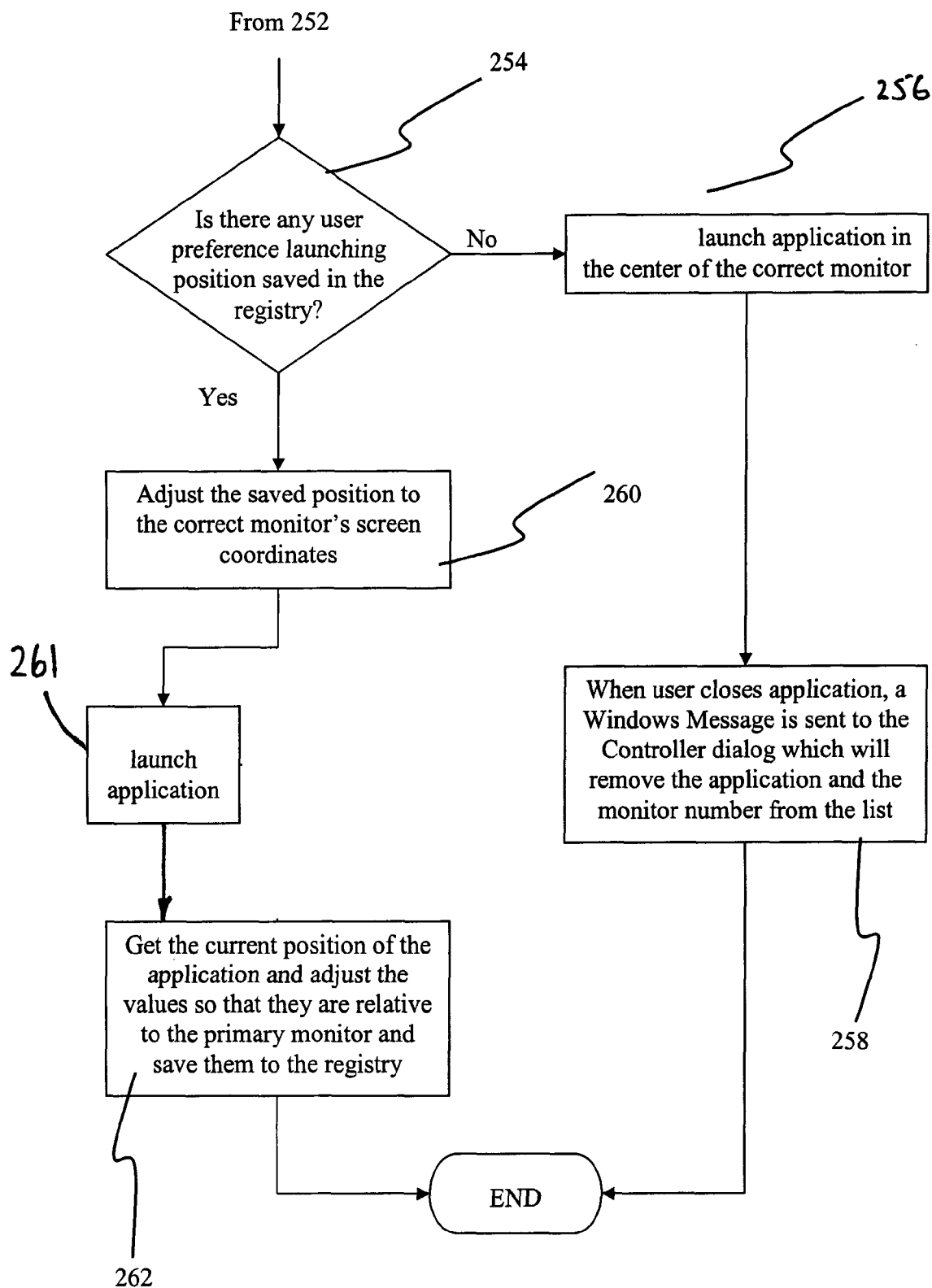
Figure 4E:
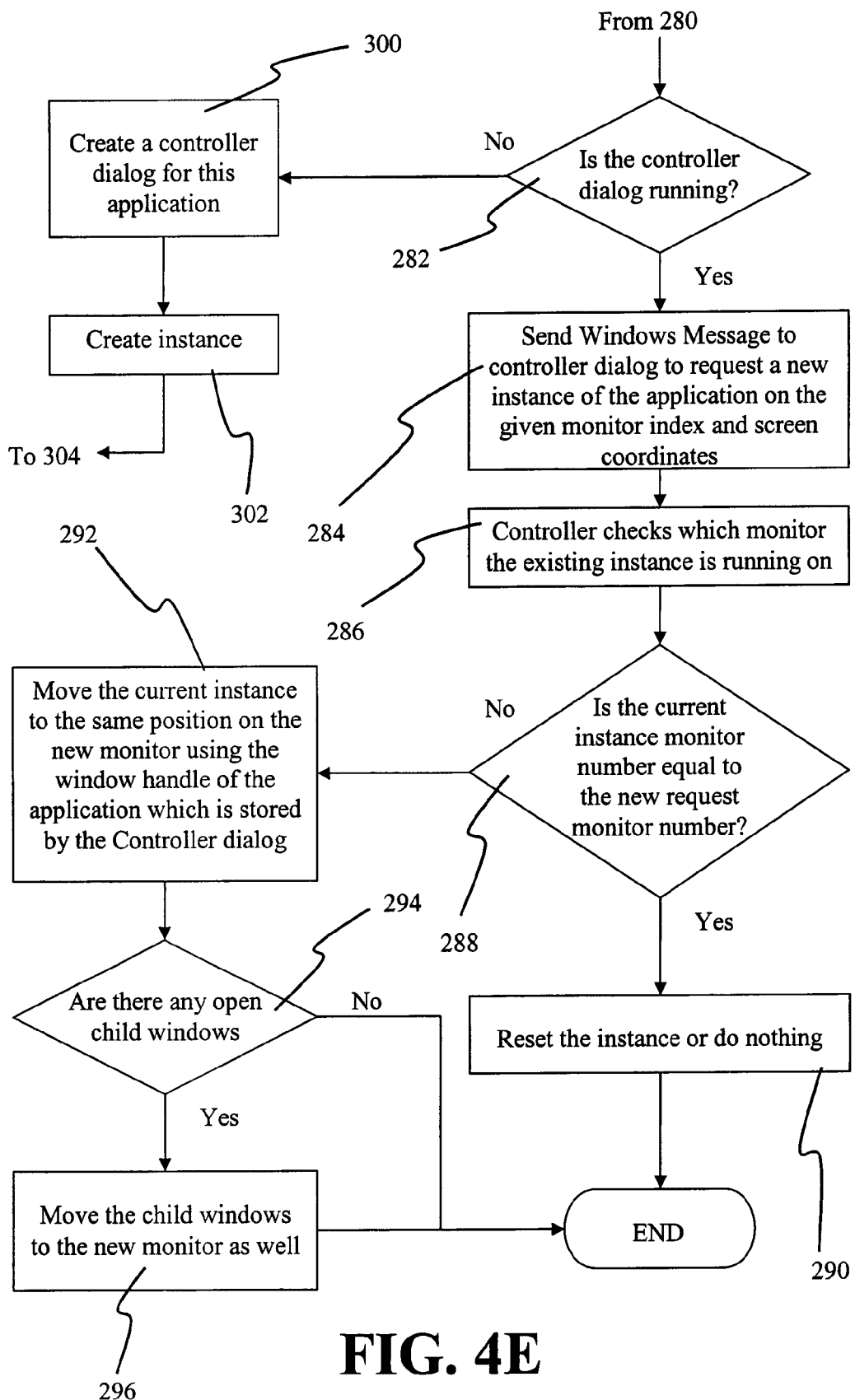
Figure 4F:
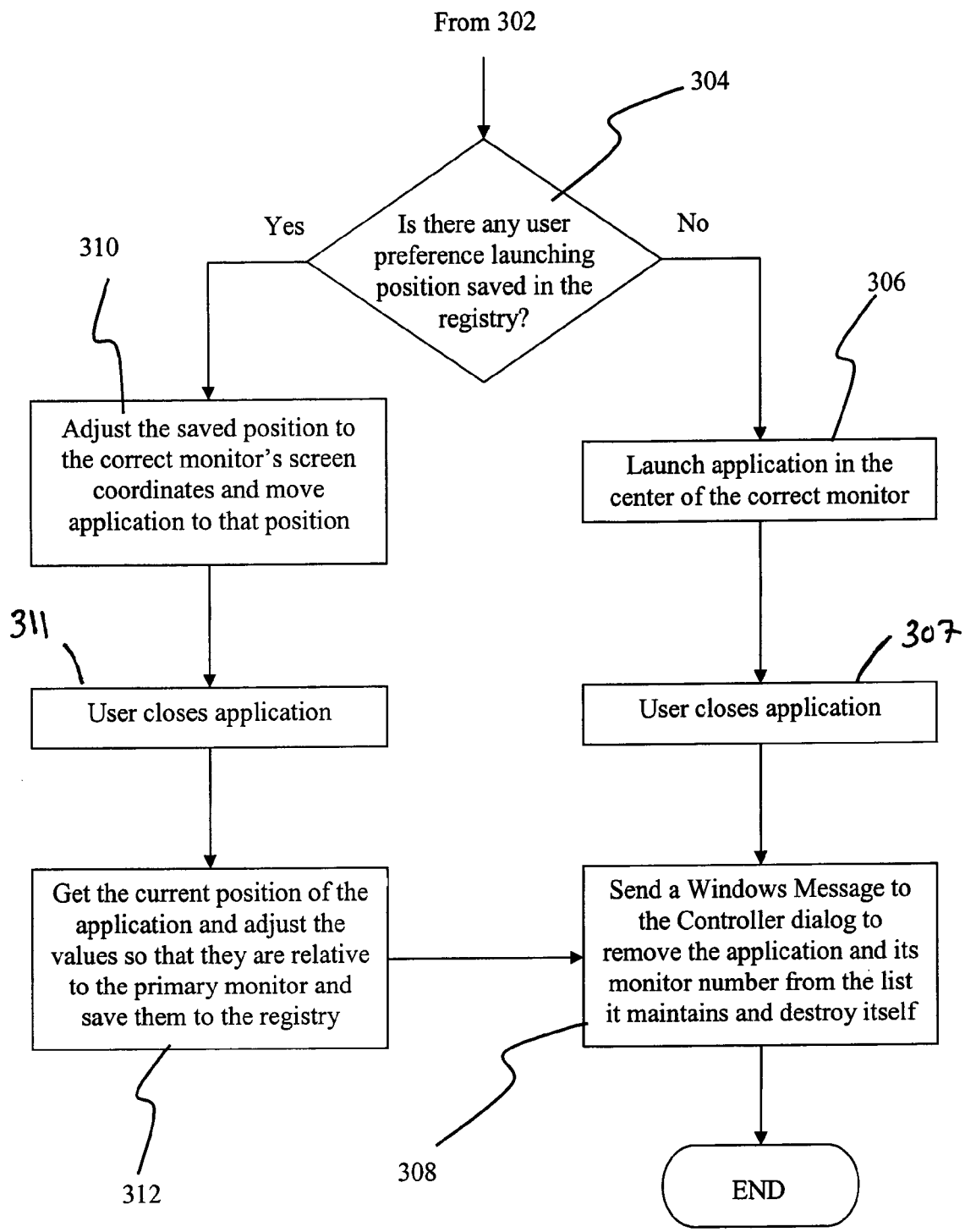

FIGS. 2 and 3 show the multi-monitor computer system 20 deployed in a meeting room and with the physical display devices 22 to 26 taking the form of interactive whiteboards (IWBs) mounted on the walls of the meeting room at physically spaced locations. Each IWB 22 to 26 is connected to the central computer 28 either via a cable that is received by a respective socket of a video card installed in the central computer 28 or via a network connection. The laptop computers 30 to 34 in this configuration communicate with the central computer 28 via wireless communication links. Alternatively, each IWB 22 to 26 may comprise an embedded processing unit that controls its display and that receives communication directly from one or more of the laptop computer 30 to 34.

In this embodiment, IWBs 22 and 24 are 600i series interactive whiteboards manufactured by SMART Technologies ULC, of Calgary, Alberta, Canada, assignee of the subject application. As can be seen, each IWB 22, 24 comprises an analog resistive touch screen 70 having a touch surface 72. The touch surface 72 is surrounded by a bezel 74. A tool tray 76 is affixed to the bezel 74 adjacent the bottom edge of the touch surface 72 and accommodates one or more tools that are used to interact with the touch surface 72.

A boom assembly 82 is mounted above the touch screen 70 via a mounting bracket 84. The boom assembly 82 comprises a generally horizontal boom 86 that extends outwardly from the mounting bracket 84 and supports a projector 88 adjacent its distal end. The projector 88 is aimed at the touch screen 70 so that the image projected by the projector 88 is presented on the touch surface 72.

During operation of each IWB 22, 24, the projector 88 receives video output from the central computer 28 and projects a video image onto the touch surface 72. The video image may be the desktop of the central computer 28 or the desktop of one of the laptop computers 30 to 34. When a user contacts the touch surface 72 of one of the IWBs with a pointer such as a finger, pen tool, or other object, the contact is detected by the IWB and the position of the contact in touch screen (x,y) coordinates is conveyed to the central computer 28. The central computer 28 in response maps the touch screen (x,y) coordinates to the computer display coordinates and processes the resultant input. Depending on the nature of the resultant input, the touch surface contact may be treated as writing or drawing or as a mouse event. As a result, pointer contacts on and pointer movements across the touch surface 72 can be recorded by the central computer 28 as writing or drawing or used to control execution of one or more application programs loaded on the central computer 28. The central computer 28 also updates the video output conveyed to the projector 88 so that the video image presented on the touch surface 72 reflects the pointer activity.

IWB 26 is a DViT camera-based interactive whiteboard manufactured by SMART Technologies ULC, of Calgary, Alberta, Canada, assignee of the subject application and is similar to those described in U.S. Pat. Nos. 6,803,906; 6,972,401; and 7,236,162. The IWB 26 comprises a rectangular bezel or frame 100 surrounding the display screen of a projection device such as for example a plasma display or LCD. A tool tray 102 is affixed to the bezel 100 and accommodates one or more pen tools that are used to interact with the projection device. The projection device receives video output from the central computer 28 and displays a video image on its display screen 106. Digital cameras 104 are provided adjacent at least two corners of the bezel 100. The digital cameras 104 have overlapping fields of view that encompass and look generally across the display screen 106.

During operation, the digital cameras 104 acquire images generally looking across the display screen 106 from different viewpoints and generate image data. Image data acquired by the digital cameras 104 is processed by on-board digital signal processors to determine if a pointer exists in the captured image data. When it is determined that a pointer exists in the captured image data, the digital signal processors generate pointer information packets (PIPs) and convey the PIPs to a master controller. Upon receipt of the PIPs, the master controller processes the PIPs using triangulation to determine the location of the pointer in the captured images relative to the display screen (x,y) coordinates. In this manner, as PIPs are generated in response to captured images, the position and movement of the pointer over the display screen 106 can be tracked turning the display screen 106 of the projection device into an interactive touch surface. The display screen (x,y) coordinates generated by the master controller are conveyed to the central computer 28. Similarly, the central computer 28 in response maps the display screen (x,y) coordinates to computer display coordinates and processes the resultant input. Depending on the nature of the resultant input, the display screen contact may be treated as writing or drawing or as a mouse event. As a result, pointer contacts on and pointer movements across the display screen 106 can be recorded by the central computer 28 as writing or drawing or used to control execution of one or more application programs loaded on the central computer 28. The central computer 28 also updates the video output conveyed to the projection device so that the video image presented on its display screen 106 reflects the pointer activity.

As is well known to those of skill in the art, a computer application can be launched in a number of ways. For example, in Window™-type operating system environments, an application may be launched from the start menu or from a taskbar icon, by double-clicking on either the application.exe, a shortcut to the application on the desktop or the application listed using Windows File Explorer, by single-clicking on either the application.exe, a shortcut to the application on the desktop or the application listed using Windows File Explorer and then pressing enter, or by double-clicking on either a shortcut to a document on the desktop or the document listed using Windows File Explorer. If the user has changed settings, the application may be launched by single-clicking on either the application.exe, a shortcut to the application on the desktop or the application listed using Windows File Explorer. Alternatively for example, in a SMART software environment, the application may be launched by selecting the "Programs" tab on the SMART Welcome Center home page and then selecting the application.

In multi-monitor computer systems difficulties can arise when a user selects an application to be launched by inputting the appropriate double-click mouse or similar event on one physical display device and the launched application appears on a different physical display device than that intended. In one embodiment, to avoid this situation, the central computer 28 executes an application launching procedure that controls the launching of selected applications so that they are launched on the intended physical display device. To achieve this, each of the IWBs 22 to 26 is registered by the central computer 28 and is assigned a unique number. One of the IWBs 22 to 26 is also designated as a default or primary IWB. When touch input is made on an IWB, the IWB, in addition to conveying the touch (x,y) coordinates to the central computer 28, conveys its unique number allowing the central computer 28 to identify the IWB that generated the touch input. When touch input is received by the central computer 28 signifying that a selected application is to be launched, together with the unique number assigned to the IWB on which the touch input is made, the application launching procedure processes the unique number and application launch event so that the selected application is launched as intended. The application launching procedure will now be further described with reference to FIGS. 4A to 4F.

When an application to be launched is selected by a user via appropriate touch input on one of the IWBs (step 200), a check is made to determine whether the application was selected from a tool tray icon menu displayed by the IWB (step 202). If the application was not selected from the tool tray icon menu, a check is made to determine whether the touch input signifying selection of the application was accompanied by a unique number (step 204). If the touch input was accompanied by a unique number, a check is made to determine whether the unique number is valid (step 206). If the unique number is valid, a display index value is set to the unique number (step 208). The coordinates of the display area of the IWB that has been assigned the unique number corresponding to the display index value are then retrieved (step 210).

At step 202, if the application was selected from the tool tray icon menu, the display index value is set to the unique number assigned to the primary IWB (step 212) before proceeding to step 210 where the display area coordinates are retrieved. Similarly, at step 204 if the touch input is not accompanied by a unique number or at step 208, if the unique number is not valid, the display index value is set to the unique number assigned to the primary IWB (step 212) before proceeding to step 210 where the display area coordinates are retrieved.

Once the display area coordinates have been retrieved at step 210, a check is made to determine if multiple instances of the selected application are permitted (step 220). If multiple instances of the selected application are permitted, a check is made to determine if unlimited instances of the selected application are permitted (step 222). If unlimited instances of the selected application are permitted, a check is made to determine if any user position preferences for the selected application are saved (step 224). If no user position preferences for the selected application exist, the central computer 28 creates an instance of the selected application and launches the selected application in a window positioned at a default location on the IWB (in this example the center of the IWB) that has been assigned the unique number corresponding to the display index value (step 226) and the application launching procedure is complete. In this manner, if the application is selected through touch input made on a registered IWB, the central computer 28 launches the selected application in a window centered on that IWB. If the application is selected via an unregistered physical display device, such as for example via one of the laptop computers 30 to 34, the central computer 28 launches the selected application at the default location on the primary IWB.

At step 224, if user position preferences for the selected application exist, the user position preferences are used so that the selected application is launched and displayed in a window positioned according to the user position preferences (step 228). At step 228, if the display index value is not associated with the primary IWB, the user position preferences are adjusted, if required, to conform to the coordinates of the IWB on which the selected application is to be launched. Adjusting the user position preferences is sometimes required due to the fact that the user position preferences are relative to the primary IWB, which may have display area coordinates that differ from the IWB on which the selected application is to be launched. The central computer 28 then creates an instance of the selected application and launches the application in a window positioned according to the user position preferences (that have been adjusted if required) on the IWB that has been assigned the unique number corresponding to the display index value (step 229). When the launched application is closed, the position of the window at closing is recorded. The recorded position is then adjusted, if required, to conform the recorded position to the display area coordinates of the primary IWB and saved (step 230).

At step 222, if unlimited instances of the selected application are not permitted, only one instance of the selected application per IWB is deemed permissible (step 240). A check is then made to determine if a controller dialog for the selected application is running (step 242). If a controller dialog for the selected application is running, a Windows message is sent to the controller dialog requesting a new instance of the selected application for the IWB that has been assigned the unique number corresponding to the display index value (step 244). In response to the Windows message, the controller dialog iterates through a list of the unique numbers assigned to IWBs that are currently running the selected application and associated application window handles (step 246) that is maintained by the controller dialog to determine if an instance of the selected application is already displayed on that IWB (step 248). If an instance of the selected application is already displayed on the IWB, depending on the selected application, one of a number of events may occur (step 250). For example, the instance of the selected application already displayed on the IWB may be reset to full screen, the instance of the selected application already displayed on the IWB may be set to its original launch position or the application select event may simply be ignored.

At step 248, if an instance of the selected application is not displayed on the IWB that has been assigned the unique number corresponding to the display index value, an instance of the selected application is created (step 252). The unique number of the IWB and the handle to the application window in which the selected application is to be presented are then added to the list maintained by the controller dialog. A check is then made to determine if any user position preferences for the selected application are saved (step 254). If no user position preferences for the selected application exist, the central computer 28 launches the selected application at the default location on the IWB that has been assigned the unique number corresponding to the display index value (step 256). When the launched application is closed, a Windows message is sent to the controller dialog instructing the controller dialog to remove the unique number of the IWB together with the application window handle from the list (step 258).

At step 254, if user position preferences for the selected application exist, the user position preferences are used so that the selected application is launched and displayed in a window positioned according to the user position preferences (step 260). At step 260, if the display index value is not associated with the primary IWB, the user position preferences are adjusted, if required, to conform to the coordinates of the IWB on which the selected application is to be launched. The central computer 28 then launches the selected application in a window positioned according to the user position preferences (that have been adjusted if required) on the IWB that has been assigned the unique number corresponding to the display index value (step 261). When the launched application is closed, the position of the window at closing is recorded. The recorded position is then adjusted, if required, to conform the recorded position to the coordinates of the primary IWB and saved (step 262). A Windows message is also sent to the controller dialog instructing the controller dialog to remove the unique number of the IWB together with the application window handle from the list (step 258).

At step 242, if a controller dialog for the selected application is not running, a controller dialog for the selected application is created (step 264) before proceeding to step 252.

At step 220, if multiple instances of the selected application are not allowed, only one instance of the selected application across all IWBs is deemed permissible (step 280). A check is then made to determine if a controller dialog for the selected application is running (step 282). If a controller dialog is running, a Windows message is sent to the controller dialog requesting a new instance of the selected application for the IWB that has been assigned the unique number corresponding to the display index value (step 284). In response to the Windows message, the controller dialog checks the list of IWB unique numbers and application window handles to determine which IWB is currently running the selected application (step 286). A check is then made to determine if the IWB running the selected application is the IWB from which the application was selected (step 288). If so, one of a number of events may occur depending on the selected application (step 290). For example, the instance of the selected application already displayed on the IWB may be reset to full screen, the instance of the selected application already displayed on the IWB may be set to its original launch position or the application select event may simply be ignored.

At step 288, if the IWB running the selected application is not the IWB from which the application was selected, the instance of the selected application is moved to the IWB that has been assigned the unique number corresponding to the display index value (step 292). The window in which the selected application is launched, is placed at the same location using the handle of the application window in the list maintained by the controller dialog. A check is then made to determine if any child windows are open (step 294). If no open child windows are detected, the application launching procedure is deemed complete. If one or more open child windows are detected, each open child window is moved to the same IWB (step 296) to complete the application launching procedure.

At step 282 if a controller dialog for the selected application is not running, a controller dialog for the selected application is created (step 300) followed by an instance of the selected application (step 302). A check is then made to determine if any user position preferences for the selected application are saved (step 304). If no user position preferences for the selected application exist, the selected application is launched and displayed at the default location on the IWB that has been assigned the unique number corresponding to the display value index and the list of IWB unique numbers and application window handles is updated (step 306). When the launched application is closed (step 307), a Windows message is sent to the controller dialog instructing the controller dialog to remove the unique number of the IWB together with the handle of the application window from the list (step 308).

At step 304, if user position preferences for the selected application exist, the user position preferences are used so that the selected application is launched and displayed in a window positioned according to the user position preferences (step 310). At step 310, if the display index value is not associated with the primary IWB, the user position preferences are adjusted, if required, to conform to the coordinates of the IWB on which the selected application is to be launched. The central computer 28 then launches the selected application in a window positioned according to the user position preferences (that have been adjusted if required) on the IWB that has been assigned the unique number corresponding to the display index value. When the launched application is closed (step 311), the position of the window at closing is recorded. The recorded position is then adjusted, if required, to conform the recorded position to the coordinates of the primary IWB and saved (step 312). A Windows message is also sent to the controller dialog instructing the controller dialog to remove the unique number of the IWB together with the application window handle from the list (step 308). Appendix A is a psuedocode representation of the application launching procedure described above.

Figure 5:
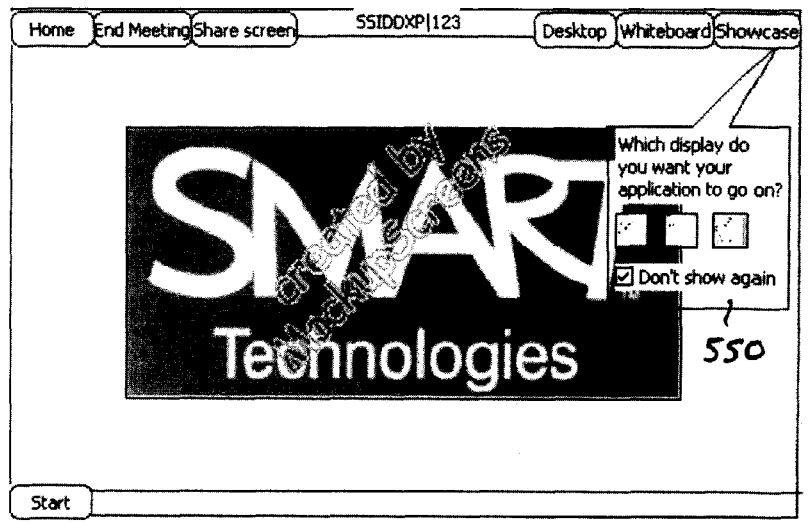
FIG. 5 shows a desktop presented on an interactive whiteboard including a bubble window.

In an alternative embodiment as shown in FIG. 5, when an application launch event is detected, the application launching procedure presents a bubble window 550 on the IWB that was used to initiate the application launch event. The bubble window 550 shows a representation of the available IWBs and includes a prompt asking the user to select the IWB on which the selected application is to be launched. In this example, the IWB representations are thumbnails (i.e. small replica images) of the IWBs. When an IWB representation in the bubble window 550 is selected, the central computer 28 creates an instance of the selected application and launches the selected application at the default location on the IWB associated with the selected IWB representation. Similar to the previous embodiment, a check can be made to determine if user position preferences for the selected application exist and if so, the user position preferences are used to position the application window on the IWB.

If desired, if an IWB representation shown in the bubble window 550 is not selected within a threshold period of time, the application launching procedure can be configured to instruct the central computer 28 to launch the selected application on the IWB that was used to initiate the application launch event if the IWB is registered or launch the selected application on the primary IWB if the IWB that was used to initiate the application launch event is not registered.

Alternatively, the bubble window 550 may show a link that can be selected in order to cause the IWB representations to be displayed in the bubble window. In this case, if the link followed by an IWB representation are not selected within a threshold period of time, the selected application can be launched on the IWB that was used to initiate the application launch event if the IWB is registered or on the primary IWB if the IWB that was used to initiate the application launch event is not registered.

In yet another alternative embodiment, the application launching procedure can monitor and maintain a history of touch input so that an application to be launched in response to an application launch event is launched on the IWB associated with the highest touch input traffic at the time of launching or on the IWB associated with the last touch input at the time of launching rather than automatically defaulting to the IWB that was used to initiate the application launch event.

Figure 6:
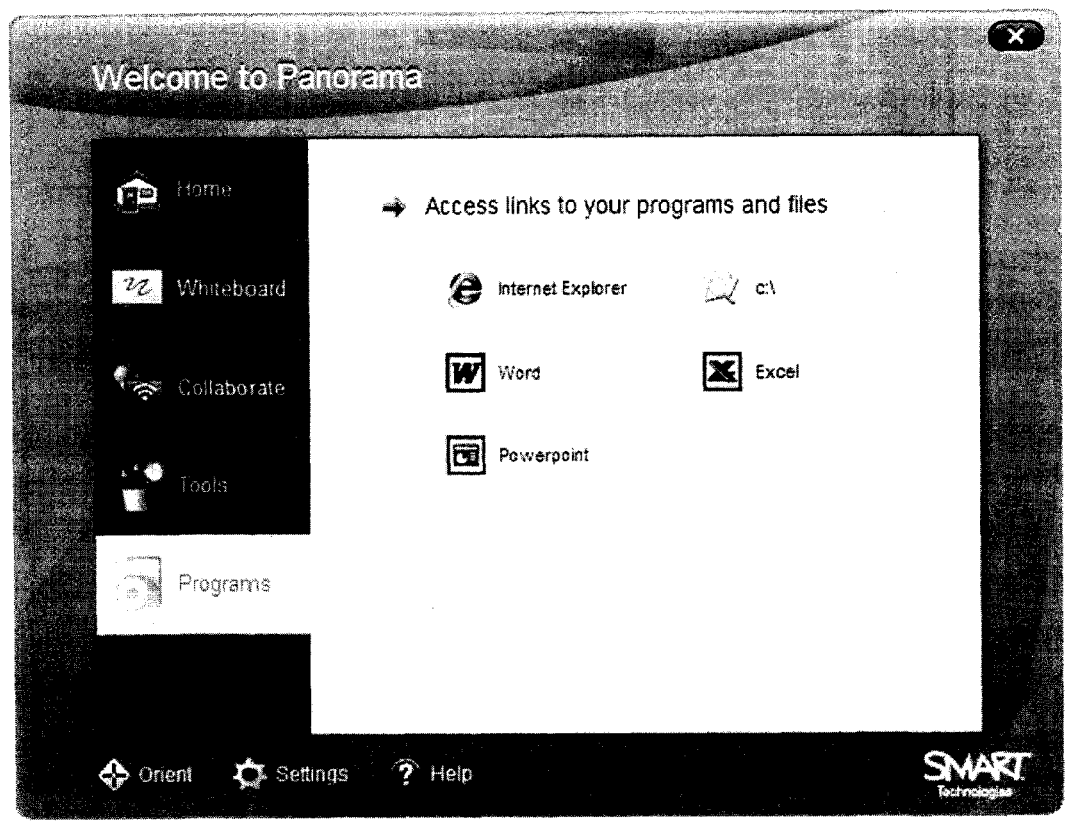
FIG. 6 shows a home page presented on an interactive whiteboard.

In still yet another embodiment, the application launching procedure run by the central computer 28 is a "home page" application that allows a set of user customizable or pre-set applications to be launched from each of the IWBs 22 to 26. The home page application causes a home page to be displayed on each of the IWBs as shown in FIG. 6. Each home page has a unique ID known to the home page application. As a result, when an application is launched by selecting the program tab of the home page and then selecting the desired application, the unique ID of the home page is returned to the home page application with the application launch event. The home page application uses the unique ID to ensure the selected application is launched on the IWB that was used to initiate the launch event. In order to specify the IWB on which the selected application is to be launched, the home page application can set a flag in the STARTUPINFO structure that is passed in the CreateProcess function. Alternatively, the home page application can make use of the PROCESS_INFORMATION structure when the launch event is initiated to obtain process ID for the selected application to be launched. Once the process for the selected application has been created, the process IDs for all windows run by the central computer 28 can be obtained using GetWindowThreadProcessId() and compared with the process ID obtained from the PROCESS_INFORMATION structure thereby to determine the window of the selected application. With the window of the selected application known, the window can be moved to the IWB that was used to initiate the launch event.

The application launching procedure may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described above with reference to the figures, those of skill in the art will appreciate that variations and modifications may be made without departing from the spirit and scope thereof as defined by the appended claims.

APPENDIX A

1.0: Launch to Correct Physical Display Device i.e. Monitor:

```
Monitor Index Determination (1.1)
Number of Instances Determination (1.2)
IF unlimited flag
    THEN unlimited instances function (1.3)
ELSE
IF one-instance-per-monitor flag
    THEN one-instance-per-monitor-function (1.4)
ELSE one-instance-across-all-displays-function (1.5)
```

1.1: Monitor Index Determination:

```
IF application launched from tray icon menu
    THEN set monitor index to primary monitor (1.7)
ELSE
    IF monitor number is given
        THEN
            IF given monitor is a valid index
                THEN set monitor index to given index
            ELSE set monitor index to primary monitor (1.7)
    ELSE set monitor index to primary monitor (1.7)
```

1.2: Number of Instances Determination

```
IF multiple instances allowed
    THEN
        IF unlimited instances allowed
            Set unlimited flag
        ELSE
            Set one-instance-per-monitor flag
ELSE set one-instance-across-all-displays flag
```

1.3: Unlimited Instances Function

```
IF any user preference launching saved in the registry
    THEN adjust saved position to new monitor index (1.6)
         and launch application to that position
ELSE launch application in the center of the correct monitor.
```

1.4: One-Instance-Per-Monitor Function

```
IF Controller dialog is running
    THEN IF check if new instance can be launched (1.4.1) returns
false
        THEN IF application is Screen Shade or Magnifier
            THEN reset application
        ELSE do nothing
        return (end)
    ELSE create a Controller Dialog
    Create instance and add handle to the instance and monitor number to
the list the      Controller dialog maintains.
    IF any user position preference is saved in the registry
        THEN Change saved position to be relative to new monitor
index (1.6.1)
            and launch application to that position
        ELSE launch application in the center of the correct monitor
```

1.4.1: Check if New Instance can be Launched

```
Send message to Controller dialog to request new instance
Controller dialog will iterate through its list of existing instances and
see
if any of       monitor indices match up with the new monitor index.
IF new monitor index found in Controller dialog's list of instances
    THEN return false
ELSE return true
```

1.5: One-Instance-Across-All-Displays Function

```
IF Controller Dialog is running
    THEN move current instance to new monitor. (1.5.1)
ELSE Create new Controller dialog
    Create instance and add handle to the instance and monitor
    number to the list the     Controller dialog maintains.
    IF any user position preference is saved in the registry
    THEN Change saved position to be relative to new monitor
index (1.6.1)
            and launch application to that position
        ELSE launch application in the center of the correct monitor
```

1.5.1. Move Current Instance to New Monitor

```
Send message to Controller dialog to move current instance to new
monitor
    IF current monitor index is equal to new monitor index
        THEN IF application is Screen Shade or Magnifier
            THEN reset application
        ELSE do nothing
    ELSE move instance to new monitor
        IF there are any open child dialogs
            THEN move them to new monitor, on top of parent dialog
```

1.6: Adjust Saved Position to the New Monitor Index

```
Set PrimaryMonitorNumber to primary monitor (1.7)
IF NewMonitorIndex is equal to PrimaryMonitorNumber
    THEN do nothing
ELSE
    Change saved position to be relative to new monitor
index.(1.6.1)
```

1.6.1: Change Saved Position to be Relative to New Monitor Index

```
Get SavedPositionCoordinates from registry
Adjust For Menu Bar(1.6.1.0)
Get Rectangle coordinates for new monitor index
Add new monitor rectangle's x-coordinate to
SavedPositionCoordinate's x-coordinate.
Add new monitor's y-coordinate to SavedPositionCoordinate's y-
coordinate.
```

1.6.1.0: Adjust for Menu Bar

```
IF SavedPositionCoordinates are falling under Top Bar Coordinates
    THEN move SavedPositionCoordinates down
ELSE do nothing
```

1.7: Set Monitor Index to Primary Monitor

```
FOR number of connected monitors
    IF monitor is the primary monitor
        THEN set monitor index to primary monitor
    ELSE set monitor index to 0
```

1.8 Adjust Position to be Relative to Primary Monitor

```
Set PrimaryMonitorNumber to primary monitor (1.7)
IF CurrentMonitorIndex is equal to PrimaryMonitorNumber
    THEN do nothing
ELSE
    Change position to be relative to primary monitor (1.8.1)
```

1.8.1: Change Position to be Relative to Primary Monitor

```
Get current window position coordinates
Get monitor screen coordinates of the monitor the application window
is currently on
IF current window position's x-coordinate is less than zero and monitor
screen's
    x-coordinate is less than zero
        THEN multiply monitor screen's x-coordinate by (−1) to make it
positive
    and add this positive value to the current window position's x-
    coordinate to get the x-coordinate relative to the primary
    monitor.
ELSE subtract the monitor screen's x-coordinate from the current
    window position's x-coordinate to get the x-coordinate relative to
    the primary monitor.
IF current window's y-coordinate is less than zero and monitor screen's
    y-coordinate is less than zero
        THEN multiply monitor screen's y-coordinate by (−1) to make it
positive
    and add this positive value to the current window position's y-
    coordinate to get the y-coordinate relative to the primary
    monitor.
ELSE subtract the monitor screen's y-coordinate from the current
    window position's y-coordinate to get the y-coordinate relative to
    the primary monitor.
```

2.0: On Closing Application With Launch to Correct Monitor Support

```
IF user preference position is to be saved to the registry
    THEN adjust position to be relative to primary monitor (1.8)
        and save to registry
Number Of Instances Determination (1.2)
IF one-instance-per-monitor flag
    THEN remove instance and monitor number from Controller dialog's
        list and then delete instance
        IF Controller dialog's list is empty
            THEN destroy Controller dialog
ELSE IF one-instance-across-all-displays flag
    Delete instance and Controller dialog
```

What is claimed is:

1. A method of launching a selected application in a multi-monitor computer system comprising a plurality of interactive whiteboards communicating with at least one computing device, each interactive whiteboard comprising a touch surface, said method comprising:
assigning each interactive whiteboard of the multi-monitor computer system a unique identifier thereby to register each interactive whiteboard with said at least one computing device, each interactive whiteboard transmitting its assigned unique identifier to said at least one computing device with every touch event thereon;
designating one of the registered interactive whiteboards as a default interactive whiteboard;
at the at least one computing device, determining if an application launch event was initiated from a registered interactive whiteboard of said multi-monitor computer system by determining the existence of a valid unique identifier accompanying the launch event; and
if so, launching the application associated with the launch event so that the launched application appears on the registered interactive whiteboard and if not, launching the application associated with the launch event so that the launched application appears on the default interactive whiteboard of said multi-monitor computer system.

2. The method of claim 1 further comprising, prior to said launching, determining if multiple instances of the application associated with the launch event are permitted.

3. The method of claim 2 further comprising determining if unlimited instances of the application associated with the launch event are permitted and if so, automatically performing said launching.

4. The method of claim 3 wherein if unlimited instances of the application associated with the launch event are not permitted, said method further comprising determining if an instance of the application associated with the launch event already exists on the interactive whiteboard on which the application is to be launched and if not, automatically launching the application on that interactive whiteboard.

5. The method of claim 4 wherein if an instance of the application associated with the launch event already exists on the interactive whiteboard on which the application is to be launched, said method comprising one of resetting the existing application or ignoring the launch event.

6. The method of claim 2 wherein if multiple instances of the application associated with the launch event are not permitted, said method further comprises determining if an instance of the application associated with the launch event already exists on one of the interactive whiteboards of the multi-monitor computer system and if not, automatically launching the application.

7. The method of claim 6 wherein if an instance of the application associated with the launch event already exists, said method further comprising determining if the instance of the application exists on the interactive whiteboard on which the application is to be launched and if not, automatically moving the application to that interactive whiteboard.

8. The method of claim 7 wherein if an instance of the application associated with the launch event already exists on the interactive whiteboard on which the application is to be launched, said method comprising one of resetting the existing application or ignoring the launch event.

9. The method of claim 1 wherein during said launching, the launched application is presented in a window positioned either at a default location on the interactive whiteboard or at a user preferred position on the interactive whiteboard.

10. A non-transitory computer readable medium embodying a computer program for launching a selected application in a multi-monitor computer system, said multi-monitor computer system comprising a plurality of interactive whiteboards communicating with a common computing device, said computer program comprising:
program code for assigning each interactive whiteboard of the multi-monitor computer system a unique identifier thereby to register each interactive whiteboard with said computing device, each interactive whiteboard transmitting its assigned unique identifier to the common computing device with every touch event thereon;
program code for designating one of the registered interactive display devices as a default interactive whiteboard;
program code for determining if an application launch event was initiated from a registered interactive whiteboard of said multi-monitor computer system by determining the existence of a valid unique identifier accompanying the launch event; and program code for, if so, launching the application associated with the launch event so that the launched application appears on the registered interactive whiteboard and if not, launching the application associated with the launch event so that the launched application appears on the default interactive whiteboard of said multi-monitor computer system.

11. A multi-monitor computer system comprising a plurality of interactive whiteboards communicating with a common computing device executing an application launching procedure for carrying out the method of claim 1.

12. A computing device comprising memory storing an application launching procedure and a processing unit communicating with said memory, execution of said application launching procedure by said processing unit causing said computing device at least to:

assign each of a plurality of interactive whiteboards of a multi-monitor computer system a unique identifier thereby to register each interactive whiteboard with said computing device, each interactive whiteboard transmitting its assigned unique identifier to the computing device with every touch event thereon;

designate one of the registered interactive display devices as a default interactive whiteboard;

determine if an application launch event was initiated from a registered interactive whiteboard by determining the existence of a valid unique identifier accompanying the launch event; and if so, launch the application associated with the launch event so that the launched application appears on the registered interactive whiteboard and if not, launch the application associated with the launch event so that the launched application appears on the default interactive whiteboard.

13. The computing device of claim 12 wherein execution of said application launching procedure further causes said computing device to, prior to said launching, determine if multiple instances of the application associated with the launch event are permitted.

14. The computing device of claim 13 wherein execution of said application launching procedure further causes said computing device to determine if unlimited instances of the application associated with the launch event are permitted and if so, automatically perform said launching.

15. The computing device of claim 14 wherein if unlimited instances of the application associated with the launch event are not permitted, execution of said application launching procedure further causes said computing device to determine if an instance of the application associated with the launch event already exists on the interactive whiteboard on which the application is to be launched and if not, automatically launch the application on that interactive whiteboard.

16. The computing device of claim 15 wherein if an instance of the application associated with the launch event already exists on the interactive whiteboard on which the application is to be launched, execution of said application launching procedure further causes said computing device to one of reset the existing application or ignore the launch event.

17. The computing device of claim 13 wherein if multiple instances of the application associated with the launch event are not permitted, execution of said application launching procedure further causes said computing device to determine if an instance of the application associated with the launch event already exists on one of the interactive whiteboards and if not, automatically launch the application.

18. The computing device of claim 17 wherein if an instance of the application associated with the launch event already exists, execution of said application launching procedure further causes said computing device to determine if the instance of the application exists on the interactive whiteboard on which the application is to be launched and if not, automatically move the application to that interactive whiteboard.

19. The computing device of claim 18 wherein if an instance of the application associated with the launch event already exists on the interactive whiteboard on which the application is to be launched, execution of said application launching procedure further causes said computing device to one of reset the existing application or ignore the launch event.

20. The computing device of claim 12 wherein the launched application is presented in a window positioned either at a default location on the interactive whiteboard or at a user preferred position on the interactive whiteboard.

* * * * *